United States Patent
Carlson et al.

(10) Patent No.: US 11,816,394 B1
(45) Date of Patent: *Nov. 14, 2023

(54) JOINING USERS TO COMMUNICATIONS VIA VOICE COMMANDS

(71) Applicant: Amazon Technologies, Inc., Seattle, WA (US)

(72) Inventors: Ty Loren Carlson, Redmond, WA (US); Rohan Mutagi, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/123,849

(22) Filed: Mar. 20, 2023

Related U.S. Application Data

(63) Continuation of application No. 17/214,639, filed on Mar. 26, 2021, now Pat. No. 11,609,740, which is a
(Continued)

(51) Int. Cl.
| | |
|---|---|
| *G06F 3/16* | (2006.01) |
| *H04M 3/56* | (2006.01) |
| *H04N 7/15* | (2006.01) |
| *H04N 7/14* | (2006.01) |
| *G10L 13/00* | (2006.01) |

(Continued)

(52) U.S. Cl.
CPC .............. *G06F 3/167* (2013.01); *G10L 13/00* (2013.01); *G10L 13/027* (2013.01); *G10L 15/22* (2013.01); *H04M 3/56* (2013.01); *H04M 3/563* (2013.01); *H04M 3/568* (2013.01); *H04N 7/147* (2013.01); *H04N 7/15* (2013.01); *G10L 2015/223* (2013.01); *H04M 2201/40* (2013.01); *H04M 2203/5009* (2013.01); *H04M 2250/74* (2013.01)

(58) Field of Classification Search
CPC ......... G06F 3/16; G10L 13/00; G10L 13/027; G10L 15/22
See application file for complete search history.

(56) References Cited

U.S. PATENT DOCUMENTS

| 5,483,587 A | 1/1996 | Hogan et al. |
| 7,617,457 B2 | 11/2009 | Kortum et al. |

(Continued)

OTHER PUBLICATIONS

Office Acxtion for U.S. Appl. No. 16/356,968, dated Jun. 9, 2020, Carlson, "Joining Users to Communications Via Voice Commands", 22 Pages.

(Continued)

*Primary Examiner* — Anne L Thomas-Homescu
(74) *Attorney, Agent, or Firm* — Lee & Hayes, P.C.

(57) ABSTRACT

Techniques for joining a device of a third user to a communication between a device of a first user and a device of a second user are described herein. For instance, two or more users may utilize respective computing devices to engage in a telephone call, a video call, an instant-messaging session, or any other type of communication in which the users communicate with each other audibly and/or visually. In some instances, a first user of the two users may issue a voice command requesting to join a device of a third user to the communication. One or more computing devices may recognize this voice command and may attempt to join a device of a third user to the communication.

20 Claims, 9 Drawing Sheets

Related U.S. Application Data continuation of application No. 16/356,968, filed on Mar. 18, 2019, now Pat. No. 10,963,216, which is a continuation of application No. 14/753,933, filed on Jun. 29, 2015, now Pat. No. 10,235,129.

(51) Int. Cl.
  *G10L 13/027* (2013.01)
  *G10L 15/22* (2006.01)

(56) References Cited

U.S. PATENT DOCUMENTS

| | | |
|---|---|---|
| 8,345,835 B1 | 1/2013 | Or-Bach et al. |
| 8,582,565 B1 | 11/2013 | Morsy et al. |
| 8,593,501 B1 | 11/2013 | Kjeldaas |
| 8,645,575 B1 | 2/2014 | Mcknight et al. |
| 8,755,310 B1 | 6/2014 | Gopalakrishnan |
| 8,781,841 B1 * | 7/2014 | Wang ............... H04M 3/56 704/275 |
| 9,111,263 B2 | 8/2015 | Li et al. |
| 9,113,131 B1 | 8/2015 | Passe et al. |
| 9,123,344 B2 | 9/2015 | Liu et al. |
| 9,256,457 B1 | 2/2016 | Leske et al. |
| 9,401,938 B2 | 7/2016 | Bakaev |
| 10,403,272 B1 * | 9/2019 | Fanty ............... H04L 65/403 |
| 2001/0049283 A1 | 12/2001 | Thomas |
| 2002/0076025 A1 | 6/2002 | Liversidge et al. |
| 2002/0124100 A1 | 9/2002 | Adams |
| 2002/0128036 A1 | 9/2002 | Yach et al. |
| 2002/0193989 A1 | 12/2002 | Geilhufe et al. |
| 2003/0053612 A1 | 3/2003 | Henrikson et al. |
| 2003/0081115 A1 | 5/2003 | Curry et al. |
| 2003/0140121 A1 | 7/2003 | Adams |
| 2004/0246332 A1 | 12/2004 | Crouch |
| 2005/0018826 A1 | 1/2005 | Benco et al. |
| 2005/0018828 A1 | 1/2005 | Nierhaus et al. |
| 2005/0094794 A1 | 5/2005 | Creamer et al. |
| 2006/0025164 A1 | 2/2006 | Wang et al. |
| 2006/0067499 A1 | 3/2006 | Oliveira et al. |
| 2006/0079291 A1 | 4/2006 | Granovetter et al. |
| 2007/0026852 A1 | 2/2007 | Logan et al. |
| 2007/0121530 A1 | 5/2007 | Vadlakonda et al. |
| 2007/0154008 A1 | 7/2007 | Pomerantz et al. |
| 2007/0156811 A1 | 7/2007 | Jain et al. |
| 2007/0192910 A1 | 8/2007 | Vu et al. |
| 2007/0232284 A1 * | 10/2007 | Mason ............... H04M 3/42195 455/416 |
| 2007/0260684 A1 | 11/2007 | Sharma et al. |
| 2007/0276908 A1 | 11/2007 | Asthana et al. |
| 2008/0084984 A1 | 4/2008 | Levy et al. |
| 2008/0140415 A1 | 6/2008 | Shostak |
| 2008/0155029 A1 | 6/2008 | Helbling et al. |
| 2008/0165944 A1 | 7/2008 | Rosenthal et al. |
| 2009/0002480 A1 | 1/2009 | Cutler |
| 2009/0037170 A1 | 2/2009 | Williams |
| 2010/0063880 A1 | 3/2010 | Atsmon et al. |
| 2010/0079356 A1 | 4/2010 | Hoellwarth |
| 2010/0169418 A1 | 7/2010 | Whynot et al. |
| 2010/0189244 A1 | 7/2010 | Sastry |
| 2010/0251142 A1 * | 9/2010 | Geppert ............... H04W 4/21 715/758 |
| 2010/0251177 A1 | 9/2010 | Geppert et al. |
| 2011/0003585 A1 | 1/2011 | Wang et al. |
| 2011/0035220 A1 | 2/2011 | Opaluch |
| 2011/0228922 A1 | 9/2011 | Dhara et al. |
| 2012/0221321 A1 | 8/2012 | Nakamura et al. |
| 2012/0311038 A1 | 12/2012 | Trinh et al. |
| 2012/0323579 A1 | 12/2012 | Gibbon et al. |
| 2013/0027504 A1 | 1/2013 | Zhang |
| 2013/0058473 A1 | 3/2013 | de Jong |
| 2013/0094593 A1 | 4/2013 | Huang et al. |
| 2013/0141516 A1 | 6/2013 | Baldwin |
| 2013/0147784 A1 | 6/2013 | Hill |
| 2013/0258037 A1 | 10/2013 | Kim et al. |
| 2013/0337771 A1 | 12/2013 | Klein et al. |
| 2014/0025740 A1 | 1/2014 | Jaudon et al. |
| 2014/0132630 A1 | 5/2014 | Mun et al. |
| 2014/0244267 A1 | 8/2014 | Levi |
| 2014/0250173 A1 | 9/2014 | Shetty |
| 2014/0270129 A1 | 9/2014 | Bracken et al. |
| 2014/0309996 A1 | 10/2014 | Zhang |
| 2015/0023481 A1 | 1/2015 | Wu et al. |
| 2015/0026580 A1 * | 1/2015 | Kang ............... H04W 12/04 455/39 |
| 2015/0058409 A1 | 2/2015 | Wang |
| 2015/0067044 A1 | 3/2015 | Bakaev |
| 2015/0085058 A1 | 3/2015 | Zhang et al. |
| 2015/0097919 A1 | 4/2015 | Karimi-Cherkandi et al. |
| 2015/0110259 A1 | 4/2015 | Kaye et al. |
| 2015/0121252 A1 | 4/2015 | Yerli |
| 2015/0135096 A1 | 5/2015 | Dhara et al. |
| 2015/0195410 A1 | 7/2015 | de Castro et al. |
| 2015/0237203 A1 | 8/2015 | Siminoff |
| 2016/0014277 A1 | 1/2016 | Tichauer |
| 2016/0050160 A1 | 2/2016 | Li et al. |
| 2016/0078870 A1 | 3/2016 | Helm |
| 2016/0094716 A1 | 3/2016 | Caulfield et al. |
| 2016/0095141 A1 | 3/2016 | Ma et al. |
| 2016/0105472 A1 | 4/2016 | Chitroda et al. |
| 2016/0134568 A1 | 5/2016 | Woo et al. |
| 2016/0142591 A1 | 5/2016 | Modai et al. |
| 2016/0179801 A1 | 6/2016 | Venkataraman et al. |
| 2016/0239165 A1 | 8/2016 | Chen et al. |
| 2016/0261648 A1 | 9/2016 | Ruetschi et al. |
| 2016/0267545 A1 | 9/2016 | Glass et al. |
| 2016/0277708 A1 | 9/2016 | Rintel et al. |
| 2016/0316349 A1 | 10/2016 | Lee et al. |
| 2017/0020690 A1 | 1/2017 | Thompson, Jr. et al. |
| 2017/0075654 A1 | 3/2017 | Shin et al. |
| 2017/0093931 A1 | 3/2017 | Chinnapatlolla et al. |
| 2017/0206901 A1 | 7/2017 | Gunn et al. |

OTHER PUBLICATIONS

Office action for U.S. Appl. No. 14/753,933, dated Dec. 30, 2016, Carlson et al., "Joining Users to Communications via Voice Commands", 27 pages.

Office action for U.S. Appl. No. 14/753,933, dated Apr. 18, 2018, Carlson, "Joining Users to Communications via Voice Commands", 31 pages.

Office action for U.S. Appl. No. 14/753,933, dated Jul. 26, 2017, Carlson et al., "Joining Users to Communications via Voice Commands", 34 pages.

* cited by examiner

JOINING USERS TO COMMUNICATIONS VIA VOICE COMMANDS

RELATED APPLICATION

This application is a continuation of and claims priority to U.S. patent application Ser. No. 17/214,639, filed on Mar. 26, 2021, titled "JOINING USERS TO COMMUNICATIONS VIA VOICE COMMANDS," which is a continuation of and claims priority to U.S. patent application Ser. No. 16/356,968, filed on Mar. 18, 2019, now U.S. Pat. No. 10,963,216, issued on Mar. 30, 2021, titled "JOINING USERS TO COMMUNICATIONS VIA VOICE COMMANDS," which is a continuation of and claims priority to U.S. patent application Ser. No. 14/753,933, filed on Jun. 29, 2015, now U.S. Pat. No. 10,235,129, issued on Mar. 19, 2019, titled "Joining Users to Communications via Voice Commands," all of which are incorporated by reference herein.

BACKGROUND

Homes are becoming more wired and connected with the proliferation of computing devices such as desktops, tablets, entertainment systems, and portable communication devices. As these computing devices evolve, many different ways have been introduced to allow users to interact with computing devices, such as through mechanical devices (e.g., keyboards, mice, etc.), touch screens, motion, and gesture. Another way to interact with computing devices is through natural language input such as speech.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
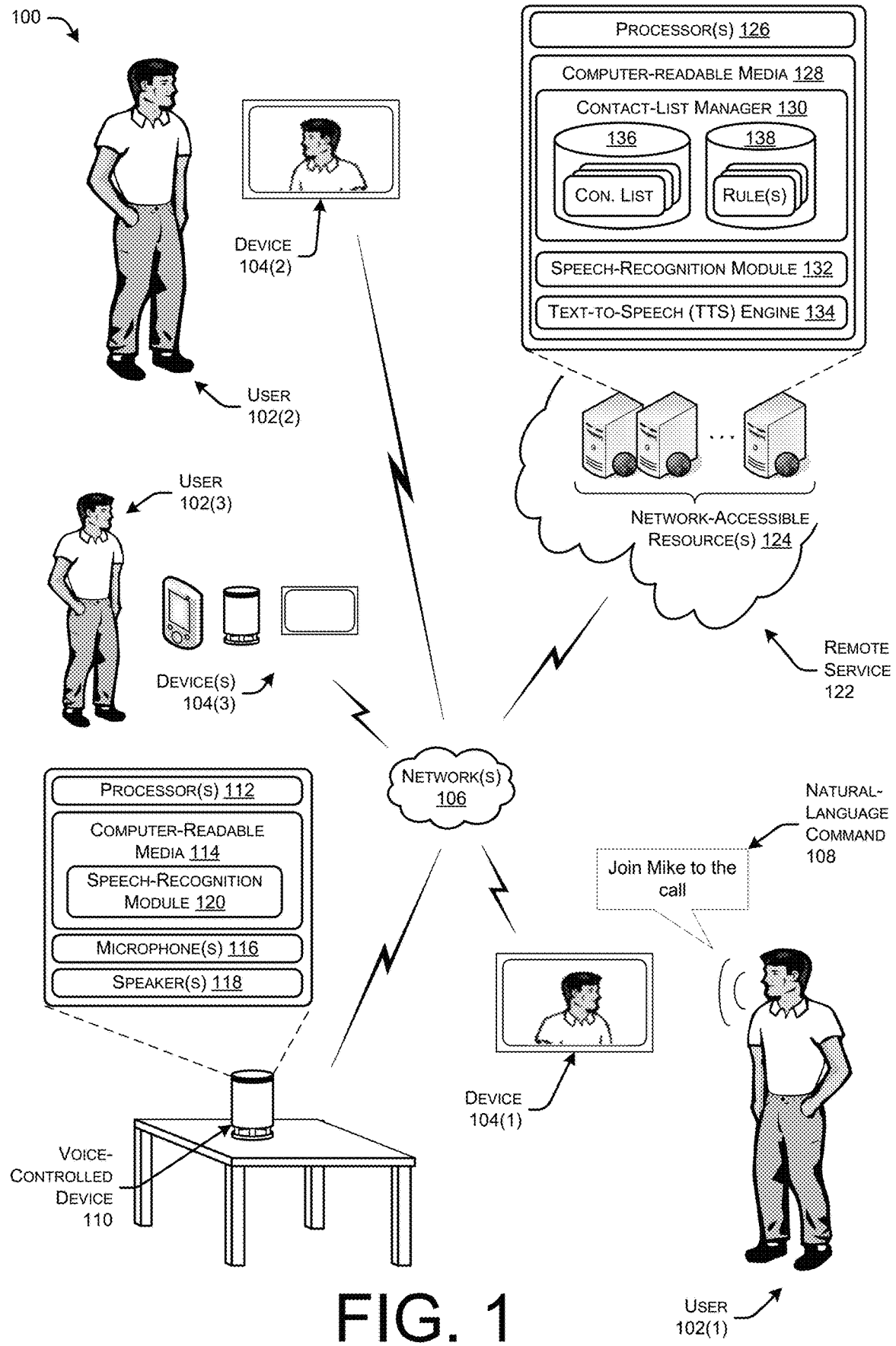
FIG. 1 is a schematic diagram of an illustrative environment in which a two users engage in a video call. During the call, one of the users issues a voice command to a voice-controlled device requesting to join a third user to the call. The voice-controlled device generates an audio signal including the voice command and sends the audio signal a remote service, which recognizes the voice command and attempts to join the third user to the video call.

Techniques for joining a device of a third user to a communication between a device of a first user and a device of a second user are described herein. For instance, two or more users may utilize respective computing devices to engage in a telephone call, a video call, an instant-messaging session, or any other type of communication in which the users communicate with each other audibly, visually, textually and/or in any other manner. In some instances, a first user of the two users may issue a voice command requesting to join a device of a third user to the communication. One or more computing devices may recognize this voice command and may attempt to join a device of a third user to the communication. To do so, the one or more computing devices may determine the identity of the third user referenced in the voice command, may determine which computing device at which to attempt to reach the third user (e.g., based on one or more rules), and may attempt to connect the computing device of the third user to the communication.

For instance, envision that two users are utilizing respective computing devices to participate in a voice-only communication (i.e., a "telephone call"). This communication may occur over a public switched telephone network (PSTN), over an IP-based wired network, over WiFi, and/or over any other type of network. The computing devices of the users, meanwhile, may comprise traditional telephones, mobile phones (i.e., smart phones), tablet computing devices, voice-controlled devices, desktop computing devices, laptop-computing devices, set-top boxes coupled to a speaker and/or a display, voice-controlled devices, car audio and phone systems, and/or any other type of computing device.

In this example, a first user of the two users may issue a voice command requesting that (at least) a third user be joined to the communication. The first user may specify the third user in any way, such as by their name, nickname, relationship to the first user, relationship to other users, and/or in any other manner. For instance, the first user may state a voice command to "join Mike Davis to the call", "join Mike to the call", "join Mike D. to the call", "join my brother to the call" (e.g., where Mike Davis is the first user's brother), "join my boss to the call" (e.g., where Mike Davis is the first user's boss), "join Steve's boss to the call" (e.g., where Mike Davis is the boss of a user named Steve), or the like. Furthermore, while the above example describes a voice command identifying a particular third user to join to the communication, in other instances the first user may request to join a particular device to the communication (e.g., "join the telephone in conference room seven to the call", "join my upstairs voice-controlled device to the call", etc.).

One or more computing devices may capture the sound associated with the voice command and may generate a corresponding audio signal. For instance, the computing device on which the first user participates in the communication may generate the audio signal, the computing device on which the second user participates in the communication may generate the audio signal, another computing in the environment of the first user may generate the audio signal, and/or the like.

In one example, a voice-controlled device within the environment of the first user captures the audio uttered by the first user and generates a corresponding audio signal. For instance, the voice-controlled device may monitor utterances within its environment for a predefined utterance (i.e., a "wake word") and, upon identifying the predefined utterance may generate an audio signal containing sound from the environment for the purpose of identifying speech therein. As such, the voice-controlled device may generate the audio signal that includes the voice command of the first user requesting to "join Mike Davis to the call" after identifying the predefined wake word.

In some instances, the voice-controlled device or another device in the environment performs speech-recognition on the audio signal to identify the voice command, while in other instances the voice-controlled device may provide the audio signal to a remote service for identifying the voice command. In the latter instances, the remote service may receive the audio signal and perform speech-recognition on the audio signal to identify the voice command of the first user. Here, for instance, the remote service may identify that the first user has requested to "join", to the first user's current call, a user named "Mike Davis". In order to comply with the request of the user, the remote service may attempt to determine the identity of user referenced in the voice command such that the remote service may attempt to join a device of this user to the call.

In some instances, upon recognizing the information identifying the third user, the remote service may attempt to identify the user within a contacts list. For instance, the remote service may recognize a name of the user (e.g., Mike Davis) or a relationship of the user to the first user that issued the voice command or to another user. For instance, if the first user requests to "join my wife to the call", the remote service may identify the first user as well as the wife of the first user in order to comply with the user's request. In some instances, the remote service may identify the first user based on receiving an identifier of a computing device (e.g., a mobile phone) that the first user is utilizing in the communication. In other instances, meanwhile, the remote service may identify the first user via voice recognition or in any other suitable manner. After identifying the first user, the remote service may identify the "wife" of the third user via social networks, a predefined mapping of the first user's family at the remote service, or the like.

In some instances, the remote service may engage in a conversation with the first user in instances where the remote service is unable to identify the third user or in instances where a calculated confidence level of the identity of the third user is less than a threshold. For example, if the remote service is unable to identify a "Mike Davis" in a contacts list of the first user, the remote service may output audio on the current communication between the first and second users requesting that the user clarify his request. For instance, the remote service may output audio stating "I could not identify Mike Davis. Can you please provide me with his telephone number?". The first user may then, in this example, provide a telephone number for Mike Davis, at which point the remote service may attempt to join the device associated with that telephone number to the communication and may store the telephone number in the contacts list of the user in association with the name "Mike Davis".

In instances where the remote service successfully identifies a name of the third user (either directly or via relationship mapping), the remote service may identify an entry of the third user in a contacts list. In some instances, the remote service accesses a contacts list associated with the first user that issued the command and/or a contacts list associated with the second user that is also participating in the communication with the first user. For instance, the remote service may access a contacts list associated with the first user in order to identify an entry in the contacts lists associated with the name "Mike Davis". As used herein, a contacts list may include any data storage that includes information for contacting one or more users, such as contacts lists stored on mobile phones or "in the cloud", contact information from email inboxes, contact information from documents, or the like.

In another example, the remote service may reference a global contacts list rather than a personalized contacts list. In this example, the remote service may attempt to identify the third user in the global contacts list using one or more pieces of context, such as the identity of the first user, the identity of the second user, a current time of day, a current day of the week, a current season, a current date, a location of the first user, a location of the second user, and/or any other piece of context. For example, the remote service may store indications of users within the global contacts lists that are known to the first user (e.g., are stored in a personalized contacts list of the first user, are connected to the first user on one or more social networks, or the like). Furthermore, the remote service may deduce whether the communication is work-related or personal based on context such as the current time of day, the current day of the week, whether the first or second user is driving, or the like. For example, the remote service may deduce that a call at 9 am on a Monday morning is more likely to be related to work than is a call at 2 pm on a Saturday afternoon. As such, the remote service may be more likely to select a work-related contact for the former instances than the latter instances when identifying the third user referenced in the voice command.

Upon identify the entry of the third user (e.g., Mike Davis) in the contacts list (global or personalized), the remote service may identify one or more computing devices that are associated with the third user, such as mobile phones, tablet computing devices, set-top boxes, and the like. The remote service may then select one of the computing devices at which to attempt to join the third user to the communication between the respective devices of the first and second users. To identify this device, in some instances the remote service may identify the device that the third user was active on most recently. That is, the entry of the third user in the contacts list may indicate the device that the third user most recently used and the remote service may use this indication to select which device on which to attempt to contact the third user.

In other instances, the remote service may reference one or more rules, which may be created by the third user, by the first or second users, or the like, when determining which device on which to attempt to contact the third user. For instance, the third user may create a rule specifying which devices he should be contacted on at different times of the day and/or days of the week. For example, the third user may specify that he should be called on his work phone from 9 am-5 pm Monday through Friday and otherwise at his home phone. In another example, the third user may create a rule specifying which devices he should be contacted on for different modes of communication. For instance, the third user may request to be contacted on his mobile phone for voice-only communications and on his tablet computing device (that includes a camera) for video calls.

In some instances, meanwhile, the remote service may implement its own rules when determining which device to attempt to contact to when joining the third user to the communication. For instance, the remote service may be configured to attempt to join a mobile phone of a user to a communication when the communication mode is voice-only and to attempt to join a computing device having a camera and a display of a threshold size to a communication when the communication mode is a video call. While a few examples have been discussed, it is to be appreciated that the third user, the remote service, the first user and/or any other entity may create any other type of rule. In addition, while the above examples describe a uniform communication mode, in some instances the techniques may implement a mixed-mode communication. For instance, if two users engage in a video communication, a third user may join the communication in a voice-only capacity, either at the request of the first or second user or at the request of the third user.

Furthermore, in some instances the remote service may implement a cascading approach in which the remote service attempts to contact the third user at multiple devices in a predefined order. Again, the third user, the first user, the remote service, and/or another entity may define this order. For instance, the remote service may first attempt to contact the user on his mobile phone, then on his laptop computing device if the remote service is unable to reach him on his mobile phone, then his tablet computing device if the remote service is unable to reach him on his laptop, and so forth. In some instances, the remote service may implement an order from highest fidelity to lowest. That is, the remotes service may attempt to join a device of the third user that is able to provide and display both video and audio and that has a largest display, before moving on to attempting to contact the third user at lower-fidelity devices (e.g., devices with smaller displays but still capable of participating in video calls, then to voice-only devices). In still another example, the remote service may implement a rule (user-defined or otherwise) in which the remote service implements an order based on cost to the third user. For instance, the remote service may first attempt to reach the third user using a connection that is free (e.g., over WiFi), before attempting to reach the user on a next-least-expensive communication channel, and so forth. Again, the entry of the third user in the contacts may maintain this predefined order in some instances.

In the instant example, the remote service may determine that the entry of the third user in the contacts list is associated with a rule stating that the third user is to be contacted on his mobile phone for voice-only communications, such as the example voice-only communication between the respective devices of the first and second users. As such, the remote service may determine an identifier (e.g., a mobile-phone number) of the mobile phone of the third user and may attempt to join the mobile phone to the communication between the first and second users. In some instances, the remote service may first initiate a communication with the device of the third user. If the third user accepts the communication, the remote service may indicate that the first user has requested that the third user join the communication with the second user. For instance, the remote service may output, audibly and/or visually, an indication that "Jon Jones has requested that you join the phone call between him and Steve Smith. Would you like to join?" The third user may accept or reject this invitation audibly, via a physical input on the computing device of the third user, or the like. If the third user rejects the invitation, the remote service may refrain from joining the mobile phone of the third user to the call. If the third user accepts, however, then the remote service may join the call with the mobile phone of the third user to the communication between the respective devices of the first and second users. In these examples, the remote service may output an indication on the communication (e.g., audibly and/or visually) that "Mike Davis has joined the call".

In some instances, the remote service may attempt to connect a voice-controlled device of the third user to the communication between the first and second users. In these instances, the remote service may send an audio signal for output at the voice-controlled device. The voice-controlled device may receive the audio signal and output the audio signal on its speakers. For instance, the device may audibly state "Jon Jones has requested that you join the phone call between him and Steve Smith. Would you like to join?" The voice-controlled device may then capture audio from its environment and generate an audio signal based on this sound. This device may then perform speech-recognition or may send this audio signal to the remote service for performing the speech-recognition. The device or the remote service may identify a user's response to the request to join the call and may perform a corresponding operation. For instance, if the third user states "yes, please join me to the call", "yes", or the like, the remote service may join the voice-controlled device to the communication." If, however, the user states "no" or the like, the remote service may refrain from joining the voice-controlled device to the communication.

The following discussion illustrates the techniques with reference to several example environments and architectures. It is to be appreciated, however, that these environments and architectures are merely illustrative and that the techniques may be applied in other environments and using other architectures.

FIG. 1 is a schematic diagram of an illustrative environment 100 in which a first user 102(1) and a second user 102(2) operate respective computing devices 104(1) and 104(2) to engage in a communication over a network 106. The network 106 may represent an array or wired networks (e.g., a PSTN network, a WAN network, etc.), wireless networks (e.g., WiFi), or combinations thereof. In this example, the communication comprises a video call in which the device 104(1) of the user 102(1) outputs both audio video from an environment of the user 102(2), and vice versa. While FIG. 1 illustrates a video call, the techniques described herein apply equally to other types of communications, such as voice-only communications, video-only communications, instant-messaging sessions, and the like.

In this example, during the video call, the user 102(1) issues a natural-language command (or "voice command") 108 to a voice-controlled device 110 requesting to join a third user 102(3), Mike, to the call. As illustrated, the voice-controlled device includes one or more processors 112, one or more computer-readable media 114, one or more microphones 116, and one or more speakers 118. The computer-readable media 114 may store a speech-recognition module 120 which, in some instances, is configured to determine when a user utters a predefined word or phrase (or "wake word"). Upon identifying the predefined word or phrase, the device may begin generating audio signals that include sound from the environment and providing the signals to a remote service 122 for performing speech-recognition thereon.

In the illustrated example of FIG. 1, the microphones 116 of the device 110 may capture audio that includes the user 102(1) speaking the wake word and, in response, the microphones 116 may generate a corresponding audio signal that includes audio from the within the environment, including audio representing the voice command 108. After generating the audio signal, the voice-controlled device 110 may provide the audio signal to the remote service 122 over the network 106.

The remote service 122 may comprise one or more network-accessible resources 124 (e.g., servers) and may generally refer to a network-accessible platform—or "cloud-based service"—implemented as a computing infrastructure of processors, storage, software, data access, and so forth that is maintained and accessible via the network 106, such as the Internet. Cloud-based services may not require end-user knowledge of the physical location and configuration of the system that delivers the services. Common expressions associated with cloud-based services, such as the remote service 122, include "on-demand computing", "software as a service (SaaS)", "platform computing", "network accessible platform", and so forth.

As illustrated, the network-accessible resources 124 of the remote service 122 may include one or more processors 126 and computer-readable media 128, which may store a contact-list manager 130, a speech-recognition module 132, and a text-to-speech (TTS) engine 134. The speech-recognition module 132 may receive the audio signal from the voice-controlled device and may attempt to identify speech from the signal. In this example, the speech-recognition module 132 may identify that the user 102(1) has requested to "Join Mike to the call". The speech-recognition module 132 may provide an indication of this voice command to the contact-list manager 130.

Upon receiving the indication of the request of the user 102(1), the contact-list manager may attempt to identify the user that the user 102(1) has requested to join to the current communication between the device 104(1) and the device 104(2). As illustrated, the contact-list manager 130 may store or otherwise have access to a datastore 136 storing one or more contacts lists and a datastore 138 storing one or more rules. The contacts lists may be associated with individual users, such as the user 102(1), or the datastore 136 may store a global contacts list associated with multiple users. In either instance, the contact-list manager may attempt to identify an entry in a contacts list corresponding to "Mike", as referenced by the voice command 108 of the user 102(1). After identifying the corresponding entry in the contacts list, the remote service 122 may attempt to join Mike to the call.

In some instances, the remote service may analyze one or more pieces of context when determining the identity of the user referenced in the voice command 108 of the user. For instance, the voice-controlled device 110 may send an indication of the identity of the user 102(1), the user 102(2), the device 104(1), and/or the device 104(2) when sending the audio signal to the remote service 122. The contact-list manger may additionally or alternatively identity a current time of day, a current day of the week, a current location of the user 102(1) and/or the user 102(2), users that the user 102(1) has most frequently and/or recently conducted communications with, and the like. With some or all of this information, the contact-list manager 130 may identify an entry associated with "Mike" in a contacts list in the datastore 136. For instance, the contact-list manager may identify an individual in a contacts list that is associated with the user 102(1) and that has a first name of Mike.

The contact-list manager 130 may also calculate a confidence indicating how confident the manager 130 is about the identification of the entry in the contacts list. If the confidence is above a threshold, the contact-list manger 130 may move on to the step of determining which device on which to attempt to contact the third user 102(3), "Mike". For instance, if the 102(1) is associated with a single entry with the first name of "Mike" in a contacts list, then the contact-list manger 130 may begin determining which device on which to contact the third user 102(3). If, however, the contact-list manger 130 identifies multiple Mikes in the contacts list associated with the user 102(1), and the contact-list manger 130 is unable to deduce with the threshold confidence which Mike the user 102(1) is referencing, then the contact-list manger 130 may output a query to the user 102(1). For instance, the contact-list manger 130 may send an audio signal for output on the device 104(1) asking the user to provide additional information, such as a last name, asking the user to select from the identified Mikes, or the like. Of course, while this example describes outputting audio, in other instances the remote service 122 may send a signal for output on a display of the device 104(1) allowing the user to select the appropriate Mike.

After the contact-list manger 130 identifies the entry corresponding to the third user 102(3) in the contact-list datastore 136, the contact-list manger 130 may determine how to join the third user 102(3) to the communication. In some instances, the entry of the user 102(3) in the contacts list may be associated with multiple devices 104(3). For instance, the user 102(3) may have registered, as part of his account with the remote service 122, a mobile phone, a voice-controlled device, a tablet computing device, and/or the like. Given that the remote service 122 may reach the user 102(3) at one or more of these multiple devices, the contact-list manger 130 may attempt to determine which device the service 122 should first attempt to join to the communication.

In some instances, the contact-list manger 130 may reference one or more rules 138 when making this determination. For instance, the third user 102(3) and/or the first user 102(1) (in this example) may have created one or more rules that the contact-list manger 130 is to execute when attempting to join the third user 102(3) to the communication. For instance, the third user 102(3) may have specified which devices the remote service 122 is to use for which times of days, days of the week, or the like. For instance, the third user 102(3) may have created a rule specifying that the remote service 122 is to call the user's mobile phone during working hours (e.g., 9 am-5 pm, Monday through Friday) and the user's tablet device at other hours. Or, the user 102(3) may have specified that the remote service refrain from contacting the user 102(3) during certain hours (e.g., nighttime hours). In still another example, the user 102(3) may have created a rule specifying which devices the remote service 122 is to contact for which modes of communication. For instance, the user 102(3) may have indicated that he is to be contacted on his mobile phone for voice-only communications and his tablet computing device for video calls.

In addition or in the alternative, the user 102(1) may have created one or more rules for execution by the contact-list manger 130. For instance, the user 102(1) may specify that the contact-list manger 130 should contact devices capable of outputting and providing audio and video for video calls. While a few example rules have been described, it is to be appreciated that any other rules may be created.

In instances where the user that is to be contacted and/or the user that initiates the connection have created rules that specify how to contact the user 102(3), the contact-list manger 130 may implement these rules. In instances where no rules apply, meanwhile, the contact-list manger 130 may be configured to implement one or more default connection strategies. For instance, the contact-list manger 130 may identify, from the identified devices 104(3) associated with the user 102(3), the device that the user 102(3) was most recently active on and may attempt to reach the user 102(3) at that device. Or, the contact-list manger 130 may identify the device having the highest fidelity for the mode of communication that the user 102(3) is being requested to join (in this case a video call) and may attempt to join the user at that device. For instance, for a video call the contact-list manger 130 may identity the device that is capable of outputting and providing both audio and video and that has a largest and/or highest-resolution display.

After selecting a device, the remote service 122 may attempt to reach the selected device of the user 102(3) and join that device to the existing communication between the device 104(1) and the device 104(2). For instance, the remote service 122 may initiate a call to the selected device and, if the user 102(3) accepts the connection, the remote service may join or conference in the user 102(3) into the communication between the users 102(1) and 102(2). If, however, the remote service 122 is unable to reach the user 102(3), then the remote service 122 may, in some instances, attempt to reach at the user 102(3) at another of his devices, and so forth until each device has been tried or a threshold number of devices has been tried.

In some instances, the remote service 122 may enable an "emergency call" setting. Here, the first user (or another user) may indicate one or more particular keywords, such as "emergency call", that when stated by the user is to result in attempting to reach the appropriate user at multiple, and perhaps all, available devices. For instance, in the example above, the first user may state "Make an emergency call to Mike Davis". The speech-recognition module 132 may identify the keywords "emergency call" and, therefore, upon identifying Mike Davis in a contacts list may attempt to reach Mike Davis at each of his devices. That is, the remote service 122 may ring each of these devices in parallel, serially, and/or the like.

In some instances, the devices of the third user may report their last known location to the remote service and/or to the calling user in these emergency instances. For instance, if Mike Davis does not answer the emergency call at one or more (e.g., all) of his devices, then those devices may self-report their current or last-known GPS coordinates back to the remote service 112, which may provide this information to the calling user. In some instances, the third user (here, Mike Davis) may define, in his account at the remote service 122, who is able to make emergency calls and/or receive the location information.

In some of the instances described above, the remote service may attempt to reach the third user 102(3) on the voice-controlled device of the user. An example voice-controlled device is discussed below with reference to FIG. 8. In these instances, the remote service 122 may invoke the TTS engine 134 to generate an audio signal for output on the voice-controlled device of the user 102(3), inviting the user 102(3) to join the existing communication. For instance, the TTS engine 134 may formulate an audio signal and send the audio signal for output on one or more speakers of the voice-controlled device of the user 102(3). The resulting audio may state the following: "Jon Jones has requested that you join the phone call between him and Steve Smith. Would you like to join?"

After outputting the query to the user 102(3), the voice-controlled device of the third user 102(3) may capture audio—potentially containing the response of the third user 102(3)—and may generate an audio signal based on this audio. The voice-controlled device may then either perform speech-recognition on this audio signal to identify the response, or may send this audio signal to the remote service for performing speech-recognition on the audio signal. For instance, the voice-controlled device of the user 102(3) may capture an audio signal that represents the user saying "yes". The speech-recognition engine 132 of the remote service 122 may identify this response ("yes") and may attempt to join the voice-controlled device of the user 102(3) to the communication.

Again, when joining the voice-controlled device of the user 102(3) to the existing communication between the devices 104(1) and 104(2), the TTS engine 134 may generate an audio signal for output on one or more of the three devices now participating on the communication. This audio signal may represent audio such as "Mike is now joining the call", thus indicating, potentially via audio output on each device of the three users, that Mike is now on the call with the first and second users.

Figure 2:
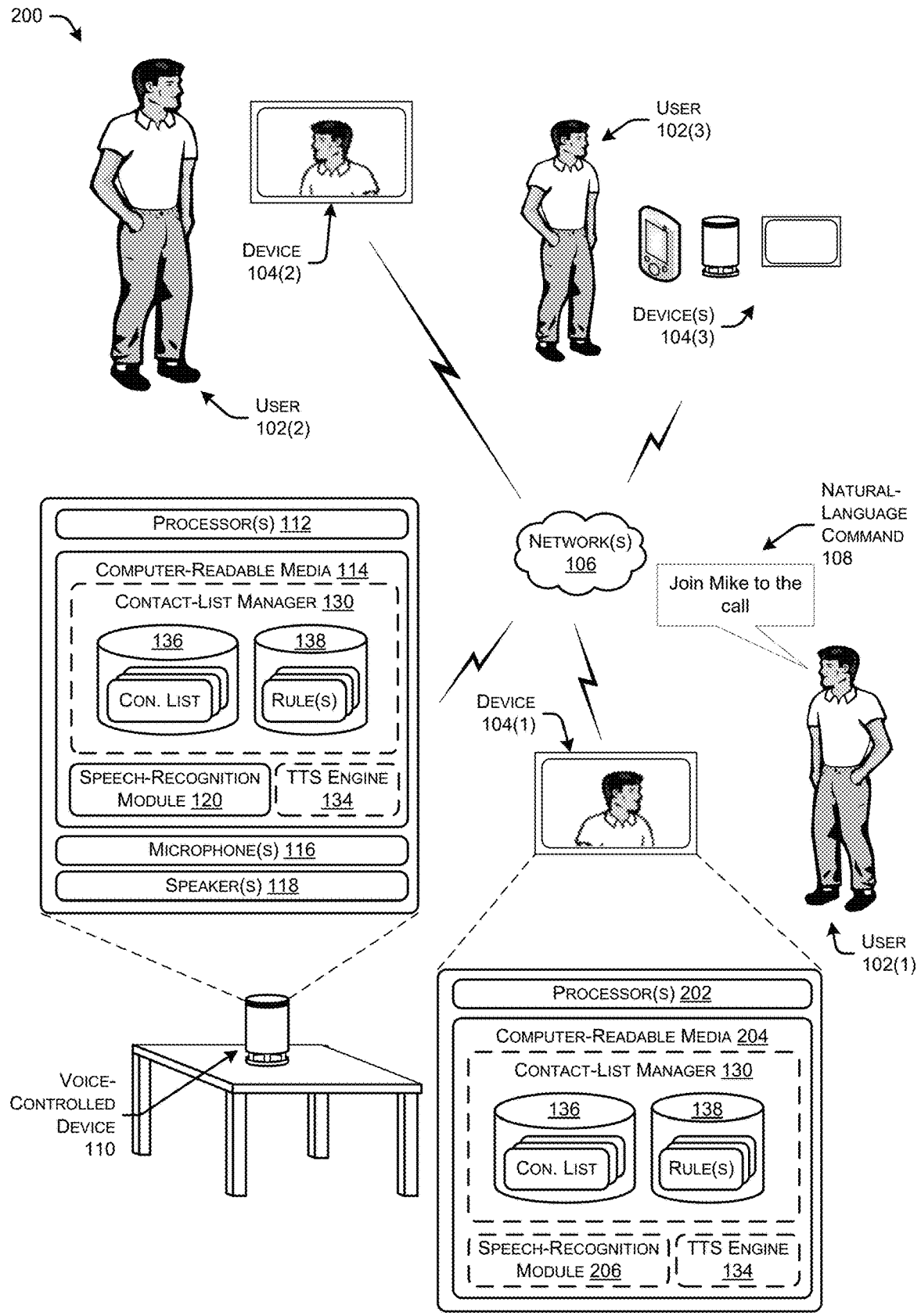
FIG. 2 is a schematic diagram of an illustrative environment in which one of the users participating in the video call issues, to a voice-controlled device or to the user's client device on which he conducts the video call, a voice command requesting to join a third user to the call. In this example, the voice-controlled device or the user's client device—rather than the remote service—recognizes the voice command and attempts to join the third user to the video call.

FIG. 2 is a schematic diagram of another environment 200 in which the users 102(1) and/or 102(2) may join a third user 102(3) (and potentially additional users) to a communication between the device 104(1) of the first user 102(1) and the device 104(2) of the second user 102(2). In the example, one or more devices that are local to the first user 102(1) and/or the second user 102(2) may implement the techniques for joining the user 102(3) to the communication, rather than the remote service 122.

Figure 4:
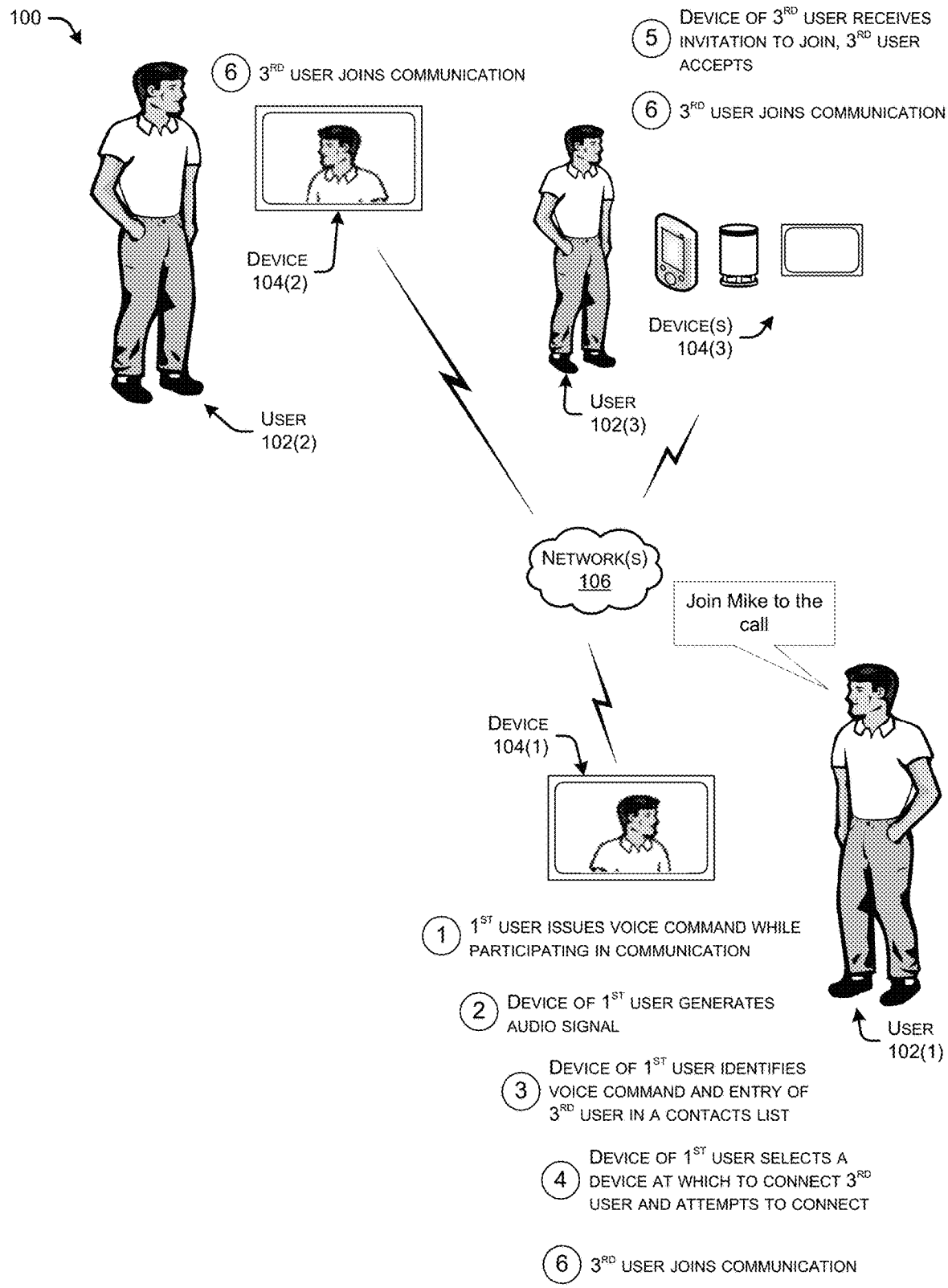
FIG. 4 illustrates an example process for a first user issuing a voice command requesting that a third user join a communication between the first user and a second user, and the user's client device—which is conducting the communication—attempting to join a device of the third user to the communication.
Figure 5:
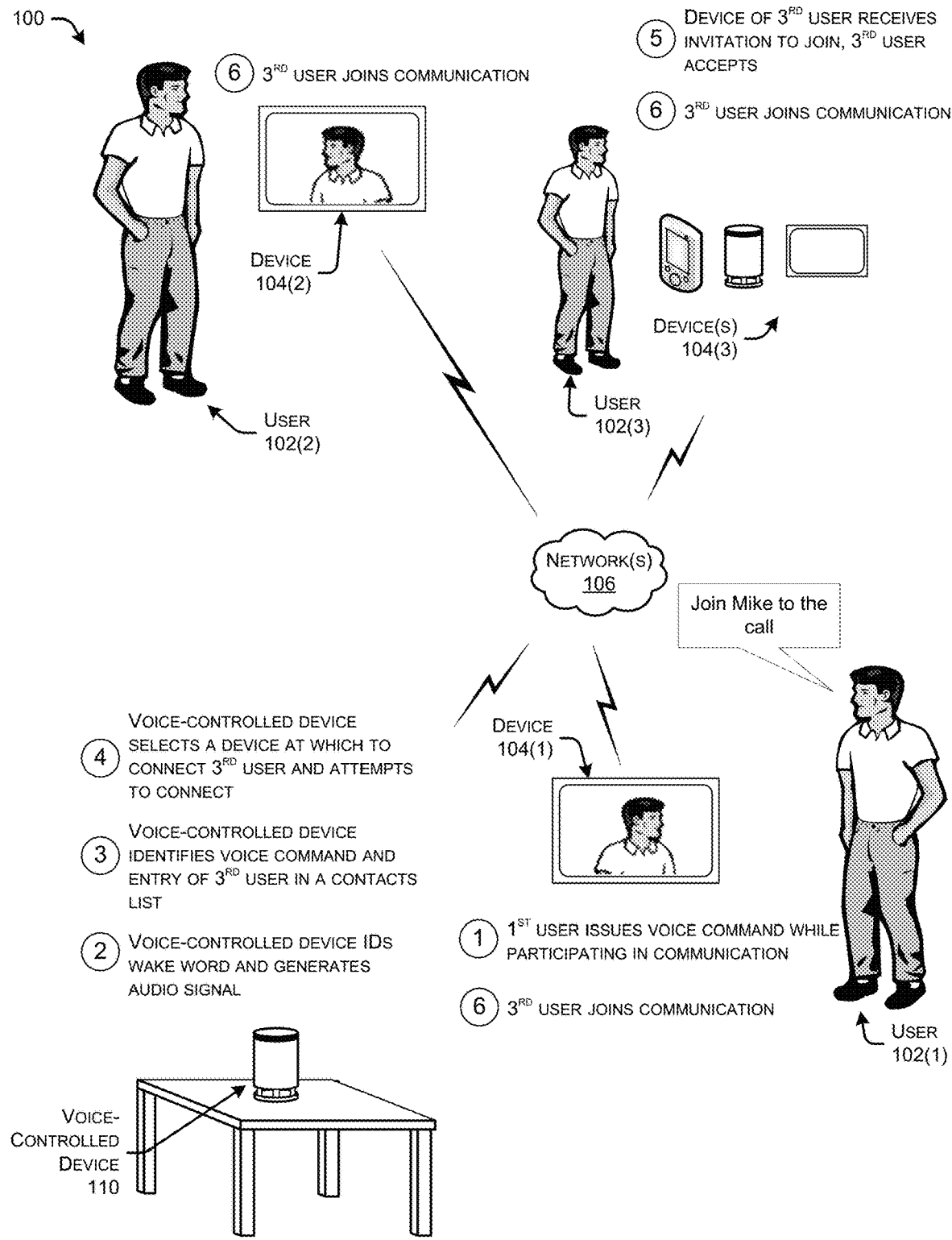
FIG. 5 illustrates an example process for a first user issuing a voice command requesting that a third user join a communication between the first user and a second user, and the voice-controlled device of FIG. 1 attempting to join a device of the third user to the communication.

As illustrated, in this example the contact-list manager 130 may reside on the device 104(1) of the user 102(1) and/or the voice-controlled device 110. In the former instances, when the user 102(1) issues the voice command 108 to join the user 102(3) to the existing video call, the device 104(1) itself may identify the command and perform the techniques discuss above. That is, device 104(1) may identify the voice command via speech-recognition, identify the entry of the referenced user in the contact-list datastore 136, and determine which device on which to reach the user 102(3), potentially with reference to one or more rules. Similarly, in instances when the voice-controlled device 110 stores an instance of the contact-list manager 130, the voice controlled device may perform the operations. FIGS. 4 and 5 discuss these embodiments in further detail.

Figure 3:
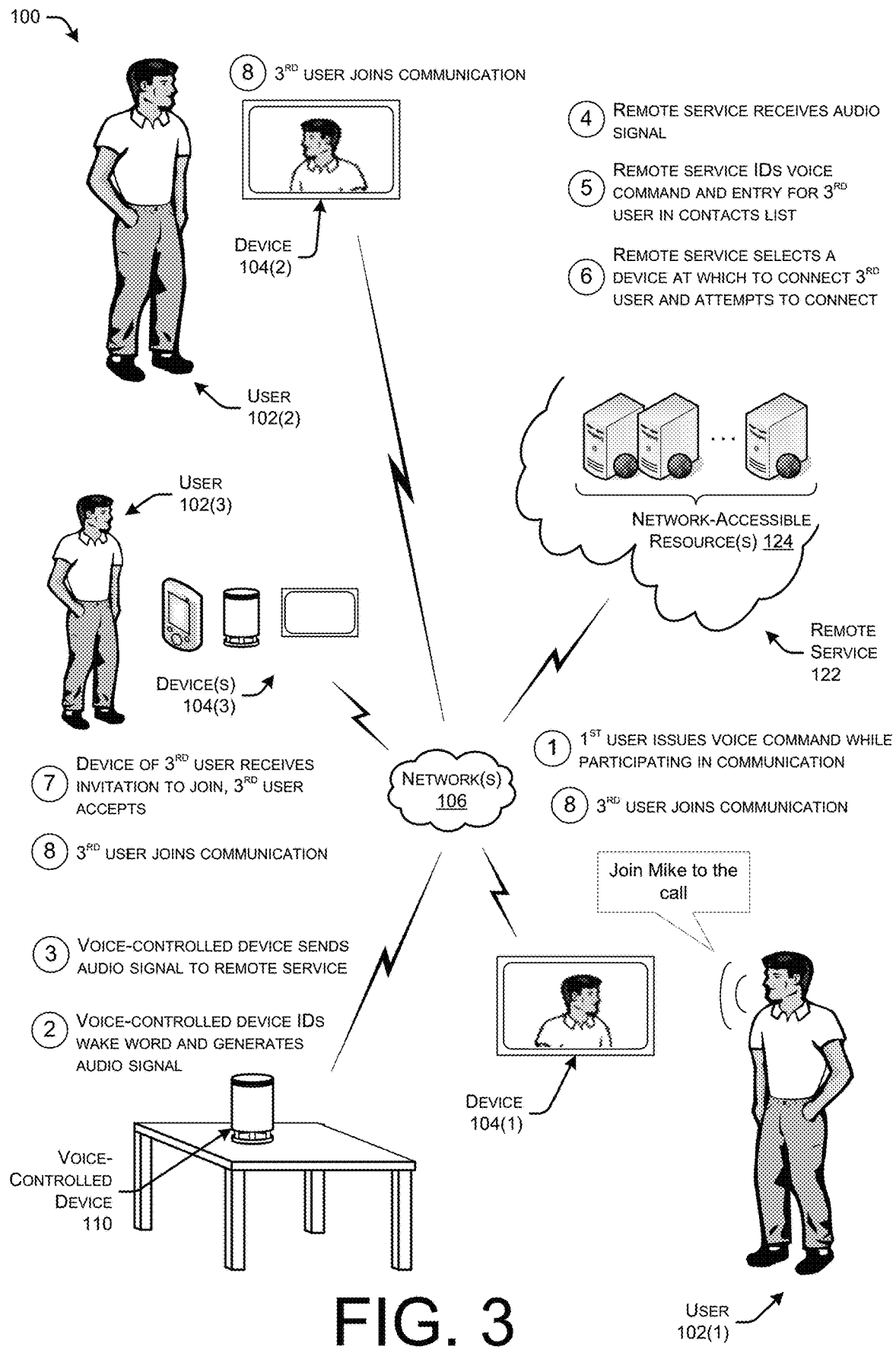
FIG. 3 illustrates an example process for a first user issuing a voice command requesting that a third user join a communication between the first user and a second user, and the remote service of FIG. 1 attempting to join a device of the third user to the communication.

FIG. 3, meanwhile, illustrates an example process for the first user 102(1) issuing the voice command 108 requesting that the third user 102(1) join a communication between the first user 102(1) and the second user 102(2), and the remote service 122 attempting to join a device of the third user 102(3) to the communication. At "1", the user 102(1) issues the voice command to "Join Mike to the call". In some instances, the user 102(1) first issues a predefined wake word prior to issuing the command 108, thus informing the voice-controlled device 110 that the user 102(1) is about to issue a command to the device 110.

At "2", in this example the voice-controlled device 110 identifies the wake word and generates an audio signal that includes the speech of the user 102(1), including the voice command to join Mike to the current call. At "3", the voice-controlled device 110 sends the audio signal to the remote service 122 over the network 106. At "4", the remote service receives the audio signal and, at "5", performs speech-recognition on the audio signal to identify the voice command. In addition, at this step the remote service 122 identifies an entry for the referenced user ("Mike") in a contacts list. As discussed above, identifying the entry may include examining an identity of the user 102(1) that issued the request (user 102(1)) and/or an identity of the user 102(2) to whom the user 102(1) is communicating with, and either identifying a personalized contacts list of this user(s) or identifying the entry in a global contacts list using the known identities of the user(s).

At "6", the remote service selects a device at which to connect the third user 102(3) to the communication and attempts to reach the user 102(3) at the selected device. As described above, the remote service 122 may execute one or more rules when making this decision. At "7", the selected device of the user 102(3) receives the invitation to join the communication and, in this example, the user 102(3) accepts the invitation. At "8", the remote service joins the device of the third user 102(1) to the communication between the devices 104(1) and 104(2). In some instances, the remote service may provide an audio and/or a visual indication of this joining (e.g., "Mike has joined the call").

FIG. 4 illustrates an example process for joining the third user 102(3) to the example communication when the device 104(1) of the first user includes the functionality for doing so. At "1", the first user 102(1) issues the voice command to "Join Mike to the call". Again, in some instances, the user 102(1) first issues a predefined wake word prior to issuing the command 108, thus informing the speech-recognition module on the device 104(1) that the user 102(1) is about to issue a command to the device 104(1). At "2", the device 104(1) generates an audio signal for performing speech-recognition thereon. At "3", the device 104(1) performs speech-recognition on the generated audio signal and identifies the voice command issued by the user. In addition, the device 104(1) may identify an entry of the referenced third user 102(3) in a contacts list, using some or all of the techniques described above.

After identifying the entry, at "4" the device 104(1) selects a device of the third user 102(1) at which to contact the third user, and attempts to reach the user 102(3) at this device. At "5", the selected device of the user 102(3) receives the invitation to join the communication and, in this example, the user 102(3) accepts the invitation. At "6", the device 104(1) joins the device of the third user 102(1) to the communication between the devices 104(1) and 104(2). Again, the device 104(1) or another device may provide an audio and/or a visual indication of this joining (e.g., "Mike has joined the call").

FIG. 5 illustrates an example process for joining the third user 102(3) to the example communication when the voice-controlled device 110 includes the functionality for doing so, rather than a remote service or a device that is actively participating in the communication. While FIG. 5 illustrates the voice-controlled device 110 of FIG. 1 as performing these techniques, it is to be appreciated that any other device within the environment of the user 102(1) and capable of performing speech recognition may perform these techniques.

At "1", the first user 102(1) issues the voice command to "Join Mike to the call". Again, in some instances, the user 102(1) first issues a predefined wake word prior to issuing the command 108, thus informing the voice-controlled device 110 that the user 102(1) is about to issue a command to the device 110. At "2", the device 110 identifies the wake word and generates an audio signal for performing speech-recognition thereon. At "3", the voice-controlled device 110 performs speech-recognition on the generated audio signal and identifies the voice command issued by the user. In addition, the voice-controlled device 110 may identify an entry of the referenced third user 102(3) in a contacts list, using some or all of the techniques described above.

After identifying the entry, at "4" the voice-controlled device 110 selects a device of the third user 102(1) at which to contact the third user, and attempts to reach the user 102(3) at this device. At "5", the selected device of the user 102(3) receives the invitation to join the communication and, in this example, the user 102(3) accepts the invitation. At "6", the voice-controlled device 110 joins the device of the third user 102(1) to the communication between the devices 104(1) and 104(2). Again, the voice-controlled device 110 or another device may provide an audio and/or a visual indication of this joining (e.g., "Mike has joined the call").

Figure 6A:
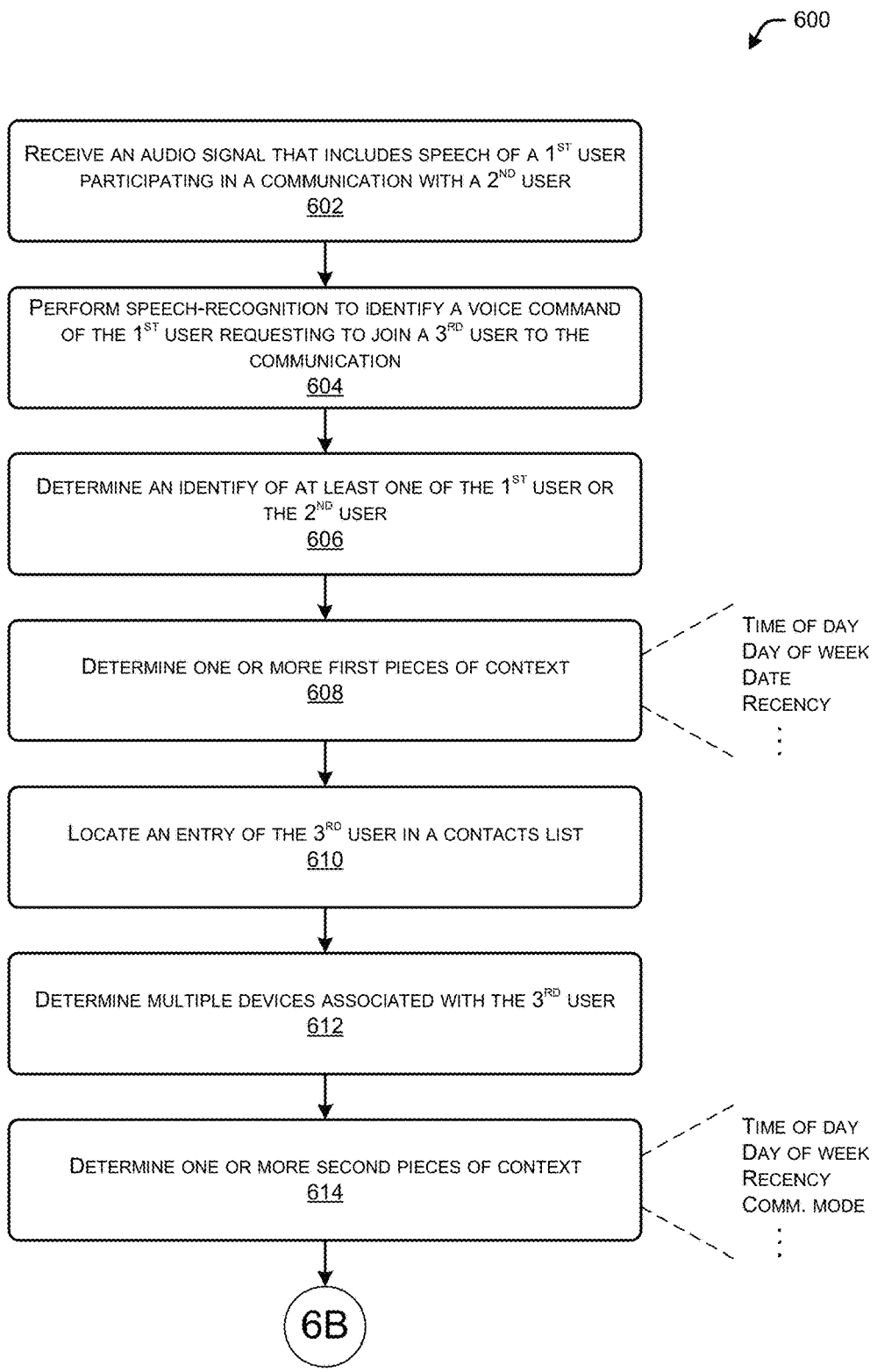
FIGS. 6A-B collectively illustrate a flow diagram of an example process for attempting to join, via voice command, a device of a third user to a communication between a device of a first user and a device of a second user.
Figure 6B:
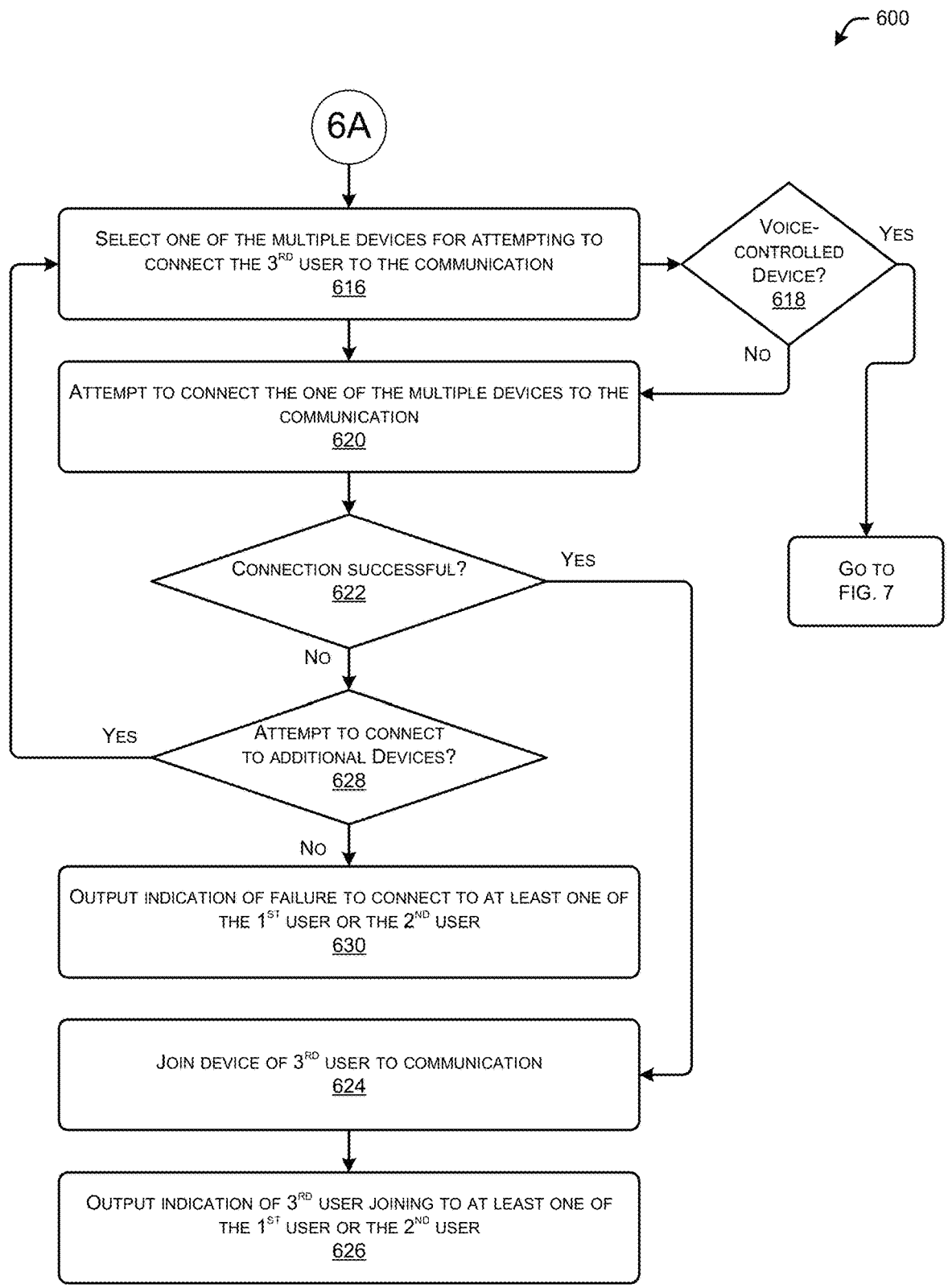

FIGS. 6A-B collectively illustrate a flow diagram of an example process 600 for attempting to join, via voice command, a device of a third user to a communication between a device of a first user and a device of a second user. This process may be implemented by a remote service, a device participating in the communication, a device in an environment of a user that is participating in the communication, and/or any other device. Furthermore, this process (as well as each process described herein) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. In some instances, the remote service 122 may implement some or all of the processes described herein. In other instances, one or more user devices may implement some or all of the processes.

At 602, the process 600 receives an audio signal that includes speech of a first user participating in a communication with a second user. At 604, the process 600 performs speech-recognition on the generated audio signal to identify a voice command of the first user requesting to join a third user to the communication.

At 606, the process 600 determines an identity of the first user and/or the second user. For instance, the process 600 may determine respective identifiers of the devices participating in the communication (e.g., phone numbers, IP addresses, etc.) and may map these identifiers to accounts of the respective users at third-party service. In addition to identifying the users participating in the communication, at 608 the process may determine one or more first pieces of context, such as a current time of day, a current day of the week, a current date, recency data indicating which users the first and second users have recently communicated with, and/or the like.

At 610, the process 600 locates an entry of the third user in a contacts list. In some instances, the process 600 utilizes the information determined at 606 and 608 to locate this entry. For instance, the process 600 may deduce the name and entry of the third user based on the identity of the users currently on the call. In addition or in the alternative, the process 600 may utilize the additional piece(s) of context information to make this determination. For instance, if the request to join the third user is received during working hours, then the process may give additional weight to contact entries that are listed as "work" contacts in a user's contact list as opposed to contact entries listed as "personal" contacts. In another example, the process 600 may analyze a call history of the first or second user and may give additional weight to those users recently called. This call history may be associated with the device that a user is currently using or all devices associated with that user. For instance, if a first user asks to join "Mike" to the call, the process 600 may identify the last "Mike" (E.g., Mike Thomas) that the first user spoke to and may output a query such as: "do you mean Mike Thomas, whom you spoke to yesterday at 6:22 pm?"

At 612, the process 600 determines multiple devices associated with the third user. As described above, after identifying the entry of the third user in the contacts list, the process 600 may identify multiple devices that the user has associated with this entry (or account). At 614, the process 600 determines one or more second pieces of context. This context may be the same or different as the first context discussed above, and may include a time, a day, a date, a communication mode that the third user is being requested to join, or the like. As discussed both above and below, this context may be helpful in selecting which device of the third user at which to attempt to reach the third user. For instance, if the third user is in a public space, the process 600 may refrain from selecting a device having video and camera capabilities, whereas the process 600 may select such a device when the third user is located at his or her home. Of course, while one example is provided, the opposite may also be true in some instances.

FIG. 6B continues the illustration of the process 600. At 616, the process 600 includes selecting one of the multiple devices of the third user for attempting to connect the third user to the communication. Again, the process 600 may utilize one or more pieces of context for making this selection. For instance, if the communication comprises a video call, then the process 600 may select a device capable of outputting and capturing both audio and video.

At 618, the process 600 determines whether the selected device comprises a voice-controlled device, such as a device having the capabilities described below with reference to FIG. 8. If so, then the process moves to FIG. 7. If not, then the process 600 attempts to connect the selected device to the communication at 620. This may include attempting to connect with the third user via the selected device and joining the selected device to the existing communication between the devices of the first and second users. At 622, the process 600 determines whether the connection was successful. If so, then at 624 the process joins the 3rd user to the communication and, at 626, outputs an indication of the third user joining to at least one of the first user or the second user. For instance, the process 600 may output an audio or visual indication stating that the third user has joined the communication.

If, however, the process determines, at 622, that the connection attempt at 620 was not successful, then at 628 the process 600 determines whether to attempt to connect to additional devices associated with the third user. For instance, if the user explicitly responded that he or she did not want to join the communication, then the process 600 may refrain from attempting to reach the user at additional devices. If, however, the third user simply did not answer, or if the user indicated a desire to join but the connection was not successful, then the process 600 may continue to attempt to reach the user at one or more different devices. As discussed above, in some instances the process 600 may cascade through multiple devices in a predefined order until reaching the third user, until attempting (and failing) to connect to a threshold number of devices, or until exhausting the list of devices associated with the third user. If the process 600 determines to attempt to connect to another device, then the process 600 returns to the operation 616 to select another device for of the third user at which to attempt to reach the third user. If the process 600 determines not do so, however, then at 630 the process 600 outputs an indication of the failure to connect the third user to at least one of the first user or the second user. For instance, the process 600 may output an audio or visual indication stating that the process 600 failed to join the third user to the communication.

Figure 7:
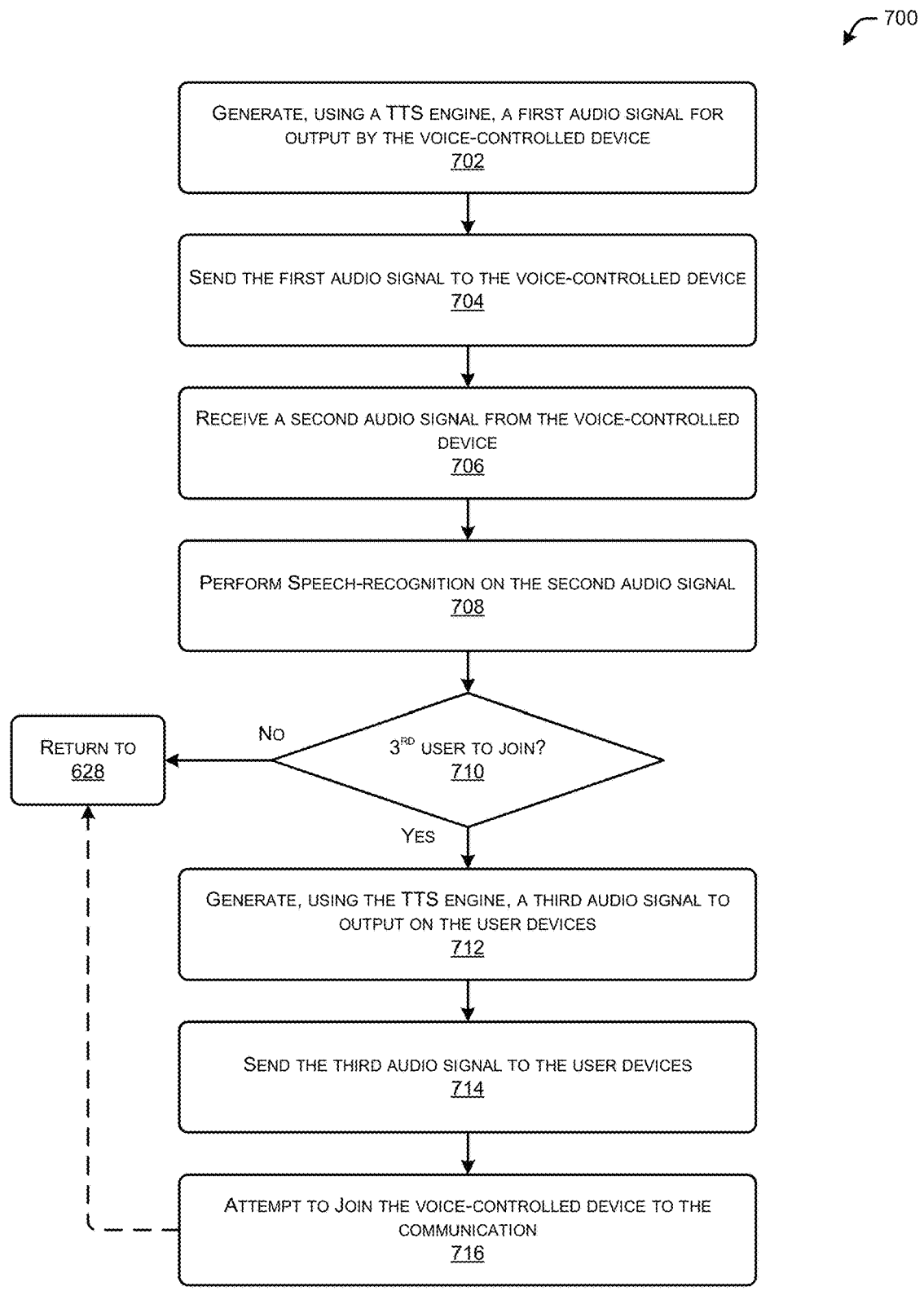
FIG. 7 illustrates a flow diagram of an example process for attempting to join a voice-controlled device to a communication between a device of a first user and a device of a second user.

FIG. 7 illustrates an example process 700 of attempting to connect a voice-controlled device of a third user to a communication between a device of a first user and a device of a second user. It is to be appreciated that while FIG. 7 describes an example in the context of a voice-controlled device, in other instances the operations of FIG. 7 may apply to any other type of device of the third user.

At 702, the process 700 generates, using the TTS engine described above, a first audio signal for output by the voice-controlled device. That is, the process 700 may generate an audio signal representing a query to output to the third user questioning whether the user would like to join the call. This audio signal may also indicate a context of the call (e.g., "Sally and Meg would like you to join their phone call").

At 704, the process 700 sends the first audio signal to the voice-controlled device. Upon receiving the first audio signal, the voice-controlled device may output the corresponding audio and may generate a second audio signal that indicates the third user's response to the query (if the user is present and provides a response). At 706, the process 700 receives the second audio signal from the voice-controlled device and performs speech-recognition on the audio signal at 708.

At 710, the process 700 determines whether the audio signal indicated that the third user is to join the communication. For instance, if the first audio signal asked "would you like to join the call?", the process 700 may determine whether the user's response was "yes" or "no". If the user did not indicate a desire to join the call, or if the user did not answer at all, then the process 700 may return to the operation 628 of FIG. 6 for determining whether to attempt to contact the third user at another device. If, however, the second audio signal indicates that the third user is to join the communication, then at 712 the process 700 generates, using the TTS engine, a third audio signal to output on one or more of the devices of the first, second, and third users. In some instances, this audio signal may indicate whether or not the third user is going to join the communication. At 714, the process 700 sends the third audio signal to one or more of the devices of the first, second, and third users, each of which may output the corresponding audio using one or more respective speakers. For instance, the third audio signal may indicate that "Mike joining the call." In some instances, the process 700 may wait to generate and/or send the third audio signal until after the process 700 has successfully joined the voice-controlled device to the communication.

At 716, the process 700 attempts to join the voice-controlled device of the third user to the communication, which may be a voice-only call or a mixed-mode call, such as where the first and second users can see and hear one another, but the third user can only hear—but not see—the first and second users (and vice versa). Further, as indicated by the dashed line, if the process 700 fails to connect the voice-controlled device to the communication after the user expresses a desire to join the communication, the process 700 may return to the operation 628 for attempting to join a different device of the third user to the communication.

Figure 8:
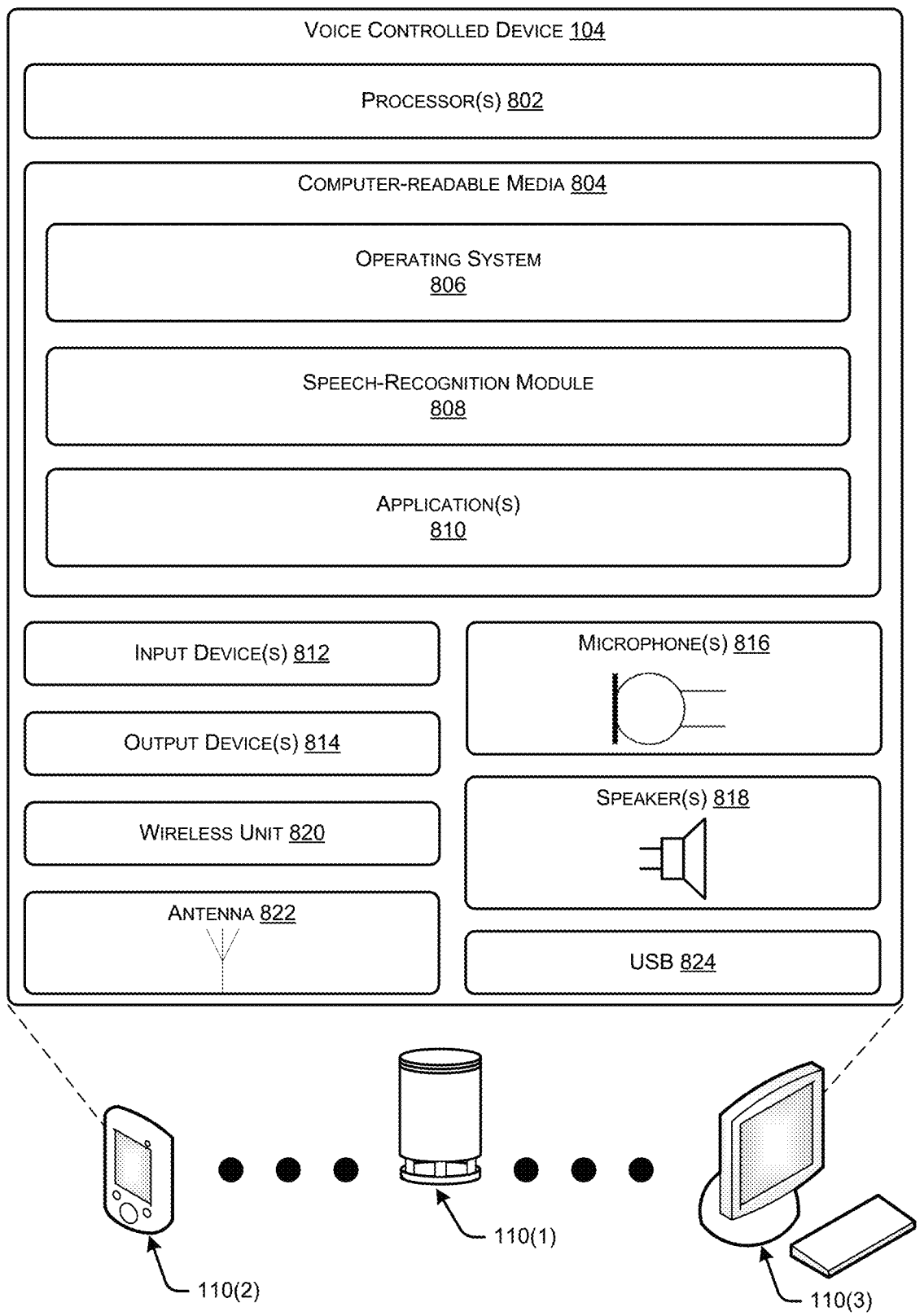
FIG. 8 illustrates example components of the voice-controlled device of FIG. 1.

FIG. 8 shows selected functional components of a natural language input controlled device, such as the voice-controlled device 110. The voice-controlled device 110 may be implemented as a standalone device 110(1) that is relatively simple in terms of functional capabilities with limited input/output components, memory, and processing capabilities. For instance, the voice-controlled device 110(1) does not have a keyboard, keypad, or other form of mechanical input. Nor does it have a display (other than simple lights, for instance) or touch screen to facilitate visual presentation and user touch input. Instead, the device 110(1) may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.). Nonetheless, the primary and potentially only mode of user interaction with the device 110(1) is through voice input and audible output. In some instances, the device 110(1) may simply comprise a microphone, a power source (e.g., a battery), and functionality for sending generated audio signals to another entity.

The voice-controlled device 110 may also be implemented as a mobile device 110(2) such as a smart phone or personal digital assistant. The mobile device 110(2) may include a touch-sensitive display screen and various buttons for providing input as well as additional functionality such as the ability to send and receive telephone calls. Alternative implementations of the voice-controlled device 110 may also include configuration as a personal computer 110(3). The personal computer 110(3) may include a keyboard, a mouse, a display screen, and any other hardware or functionality that is typically found on a desktop, notebook, netbook, or other personal computing devices. The devices 110(1), 110(2), and 110(3) are merely example form factors of a voice-controlled device and not intended to be limiting, as the techniques described in this disclosure may be used in essentially any device that has an ability to recognize speech input or other types of natural language input.

In the illustrated implementation, the voice-controlled device 110 includes one or more processors 802 and computer-readable media 804. In some implementations, the processors(s) 802 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 802 may possess its own local memory, which also may store program modules, program data, and/or one or more operating systems.

The computer-readable media 804, and other computer-readable media described herein, may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 804 may be implemented as computer-readable storage media ("CRSM"), which may be any available physical media accessible by the processor(s) 802 to execute instructions stored on the computer-readable media 804. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 802.

Several modules such as instruction, datastores, and so forth may be stored within the computer-readable media 804 and configured to execute on the processor(s) 802. A few example functional modules are shown as applications stored in the computer-readable media 804 and executed on the processor(s) 802, although the same functionality may alternatively be implemented in hardware, firmware, or as a system on a chip (SOC).

An operating system module 806 may be configured to manage hardware and services within and coupled to the device 110 for the benefit of other modules. The device 110 may further include, in some instances, a speech-recognition module 808 that employs any number of conventional speech processing techniques such as use of speech recognition, natural language understanding, and extensive lexicons to interpret voice input. In some instances, the speech-recognition module 808 may simply be programmed to identify the user uttering a predefined word or phrase (i.e., a "wake word"), after which the device 110 may begin uploading audio signals to the remote service 122 for more robust speech-recognition processing. In other examples, the device 110 itself may, for example, identify voice commands as described in certain implementations above. The voice-controlled device 110 may also include a plurality of applications 810 stored in the computer-readable media 804 or otherwise accessible to the device 110.

Generally, the voice-controlled device 110 has input devices 812 and output devices 814. The input devices 812 may include a keyboard, keypad, mouse, touch screen, joystick, control buttons, etc. In some implementations, one or more microphones 816 may function as input devices 812 to receive audio input, such as user voice input. The output devices 814 may include a display, a light element (e.g., LED), a vibrator to create haptic sensations, or the like. In some implementations, one or more speakers 818 may function as output devices 814 to output audio sounds.

A user 102 may interact with the voice-controlled device 110 by speaking to it, and the one or more microphone(s) 816 captures the user's speech. The voice-controlled device 110 can communicate back to the user by emitting audible statements through the speaker 818. In this manner, the user 102 can interact with the voice-controlled device 110 solely through speech, without use of a keyboard or display.

The voice-controlled device 110 may further include a wireless unit 820 coupled to an antenna 822 to facilitate a wireless connection to a network. The wireless unit 820 may implement one or more of various wireless technologies, such as Wi-Fi, Bluetooth, RF, and so on. A USB port 824 may further be provided as part of the device 110 to facilitate a wired connection to a network, or a plug-in network device that communicates with other wireless networks. In addition to the USB port 824, or as an alternative thereto, other forms of wired connections may be employed, such as a broadband connection.

Accordingly, when implemented as the primarily-voice-operated device 110(1), there may be no input devices, such as navigation buttons, keypads, joysticks, keyboards, touch screens, and the like other than the microphone(s) 816. Further, there may be no output such as a display for text or graphical output. The speaker(s) 818 may be the main output device. In one implementation, the voice-controlled device 110(1) may include non-input control mechanisms, such as basic volume control button(s) for increasing/decreasing volume, as well as power and reset buttons. There may also be a simple light element (e.g., LED) to indicate a state such as, for example, when power is on.

Accordingly, the device 110(1) may be implemented as an aesthetically appealing device with smooth and rounded surfaces, with one or more apertures for passage of sound waves. The device 110(1) may merely have a power cord and optionally a wired interface (e.g., broadband, USB, etc.). As a result, the device 110(1) may be generally produced at a low cost. Once plugged in, the device may automatically self-configure, or with slight aid of the user, and be ready to use. In other implementations, other I/O components may be added to this basic model, such as specialty buttons, a keypad, display, and the like. In still other implementations, the voice-controlled device 110 may simply comprise a microphone, a power source (e.g., a battery), and a network interface for sending audio signals to a remote source.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   one or more processors; and
   non-transitory computer-readable media storing computer-executable instructions that, when executed on the one or more processors, cause the one or more processors to perform operations comprising:
   receiving, from a first device, first audio data representing speech input requesting to associate a user profile with a communication session;
   determining first data associated with capability information associated with individual ones of multiple devices associated with the user profile;
   based at least in part on the first data, selecting, from the multiple devices associated with the user profile, a second device to associate with the communication session;
   sending, to the second device, second data representing a request to associate the second device with the communication session;
   determining that the request to associate the second device with the communication session was accepted; and
   associating the second device with the communication session.

2. The system as recited in claim 1, wherein the capability information comprises at least one of an audio-only indication or a video enabled indication.

3. The system as recited in claim 1, wherein determining the first data comprises determining the first data based at least in part on at least one of a current time of day, a current day of the week, or a current date.

4. The system as recited in claim 1, wherein determining the first data comprises determining the first data based at least in part on third data indicating which user profiles the first device has recently communicated in association with.

5. The system as recited in claim 1, the operations further comprising:
   accessing a contact list associated with the first device;
   identifying an indicator of the user profile in the contact list; and
   wherein determining the second device comprises determining the second device based at least in part on the indicator of the user profile being associated with the second device.

6. The system as recited in claim 1, the operations further comprising determining that the communication session is a voice-only communication session, and wherein selecting the second device comprises selecting the second device based at least in part on the second device being configured to support voice-only communication sessions.

7. The system as recited in claim 1, the operations further comprising:
   storing data indicating device types approved for communicating with the first device;
   determining that the second device is associated with at least one of the device types; and
   wherein selecting the second device comprises selecting the second device based at least in part on the second device being associated with the at least one of the device types.

8. The system as recited in claim 1, the operations further comprising:
   determining a first location associated with the first device;
   determining second location associated with the second device; and
   wherein selecting the second device comprises selecting the second device based at least in part on the first location and the second location.

9. The system as recited in claim 1, the operations further comprising:
   determining a device type associated with the second device; and
   wherein selecting the second device comprises selecting the second device based at least in part on the device type.

10. The system as recited in claim 1, the operations further comprising:
    determining that the first device is configured to output video;
    determining that the user profile is associated with the second device and a third device;
    determining that the second device is configured to output video;
    determining that the third device is unable to output video; and
    selecting the second device based at least in part on determining that the second device is configured to output video and the third device is unable to output video.

11. The system as recited in claim 10, the operations further comprising:
    determining that the second device is associated with a location indicated by contextual information; and
    wherein selecting the second device comprises selecting the second device based at least in part on the second device being associated with the location indicated by the contextual information.

12. A method comprising:
    receiving, from a first device, first audio data representing speech input requesting to associate a user profile with a communication session;
    determining first data associated with capability information associated with individual ones of multiple devices associated with the user profile;
    based at least in part on the first data, selecting, from the multiple devices associated with the user profile, a second device to associate with the communication session;
    sending, to the second device, second data representing a request to associate the second device with the communication session;
    determining that the request to associate the second device with the communication session was accepted; and
    associating the second device with the communication session.

13. The method of claim 12, further comprising:
    determining that the first device is configured to output video;
    determining that the user profile is associated with the second device and a third device;
    determining that the second device is configured to output video;
    determining that the third device unable to output video; and
    wherein selecting the second device comprises selecting the second device based at least in part the second device being configured to output video and the third device unable to output video.

14. The method of claim 12, further comprising:
    determining third data associated with the first audio data, the third data indicating contextual information associated with the first audio data; and
    wherein selecting the second device comprises selecting the second device based at least in part on the third data.

15. The method of claim 14, further comprising determining the third data based at least in part on at least one of a current time of day, a current day of the week, or a current date.

16. The method as recited in claim 14, further comprising determining the third data based at least in part on which user profiles the first device has communicated with within a threshold amount of time from receiving the first audio data.

17. The method as recited in claim 12, further comprising determining that the communication session comprises a voice-only communication session, and wherein selecting the second device comprises selecting the second device based at least in part on the second device being a voice-controlled device.

18. The method as recited in claim 12, further comprising determining that the communication session comprises a video call, and wherein the selecting the second device comprises selecting the second device based at least in part on the second device including a display configured to display video and a camera configured to capture video.

19. The method as recited in claim 12, further comprising:
    accessing a contact list of first user account data associated with the first device; and
    identifying an indicator of the user profile in the contact list;
    wherein determining the second device comprises determining the second device based at least in part on the indicator of the user profile being associated with the second device.

20. The method as recited in claim 12, further comprising determining an identity of a first user associated with the first device, and wherein the selecting the second device comprises selecting the second device based at least in part on data indicating a relationship between the user profile and an identifier of the first user.

* * * * *